United States Patent
Dai

(10) Patent No.: US 6,714,890 B2
(45) Date of Patent: Mar. 30, 2004

(54) METHOD, APPARATUS, AND MACHINE-READABLE MEDIUM TO ENHANCE MICROPROCESSOR PERFORMANCE

(75) Inventor: Xia Dai, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/751,515

(22) Filed: Dec. 29, 2000

(65) Prior Publication Data

US 2002/0087287 A1 Jul. 4, 2002

(51) Int. Cl.$^7$ ................................................ G06F 15/00
(52) U.S. Cl. ................................... 702/132; 713/322
(58) Field of Search ................................... 713/322, 320; 714/39; 361/702; 700/295, 704; 73/488; 702/130, 132, 142, 147, 75, 136, 182, 183, 186, FOR 103, FOR 104, FOR 107, FOR 134, FOR 135, FOR 147, FOR 150, FOR 170; 340/584; 165/204; 345/88

(56) References Cited

U.S. PATENT DOCUMENTS

| 5,594,864 A | * | 1/1997 | Trauben ........................ 714/39 |
| 5,615,085 A | * | 3/1997 | Wakabayashi et al. ....... 361/702 |
| 5,920,264 A | * | 7/1999 | Kim et al. .................... 340/584 |
| 5,953,237 A | * | 9/1999 | Indermaur et al. ........... 700/295 |
| 5,974,557 A | * | 10/1999 | Thomas et al. ............... 713/322 |
| 6,442,700 B1 | * | 8/2002 | Cooper ......................... 713/320 |

* cited by examiner

Primary Examiner—John Barlow
Assistant Examiner—Xiuqin Sun
(74) Attorney, Agent, or Firm—Blakely, Sokoloff, Taylor & Zafman LLP

(57) ABSTRACT

The present invention allows enhancement of a microprocessor's performance. Microprocessor-operated devices are designed for worst-case operating conditions, a thermal design power limit, such as software application instruction mix, and ambient temperature around the microprocessor. Designing for these worst-case conditions reduces the capabilities of microprocessors that do not continuously operate under worst-case operating conditions. The present invention comprises a method, apparatus, and machine-readable medium to increase a microprocessor's speed by facilitating operation of the microprocessor above the thermal design power limit.

5 Claims, 6 Drawing Sheets

Figure 3:
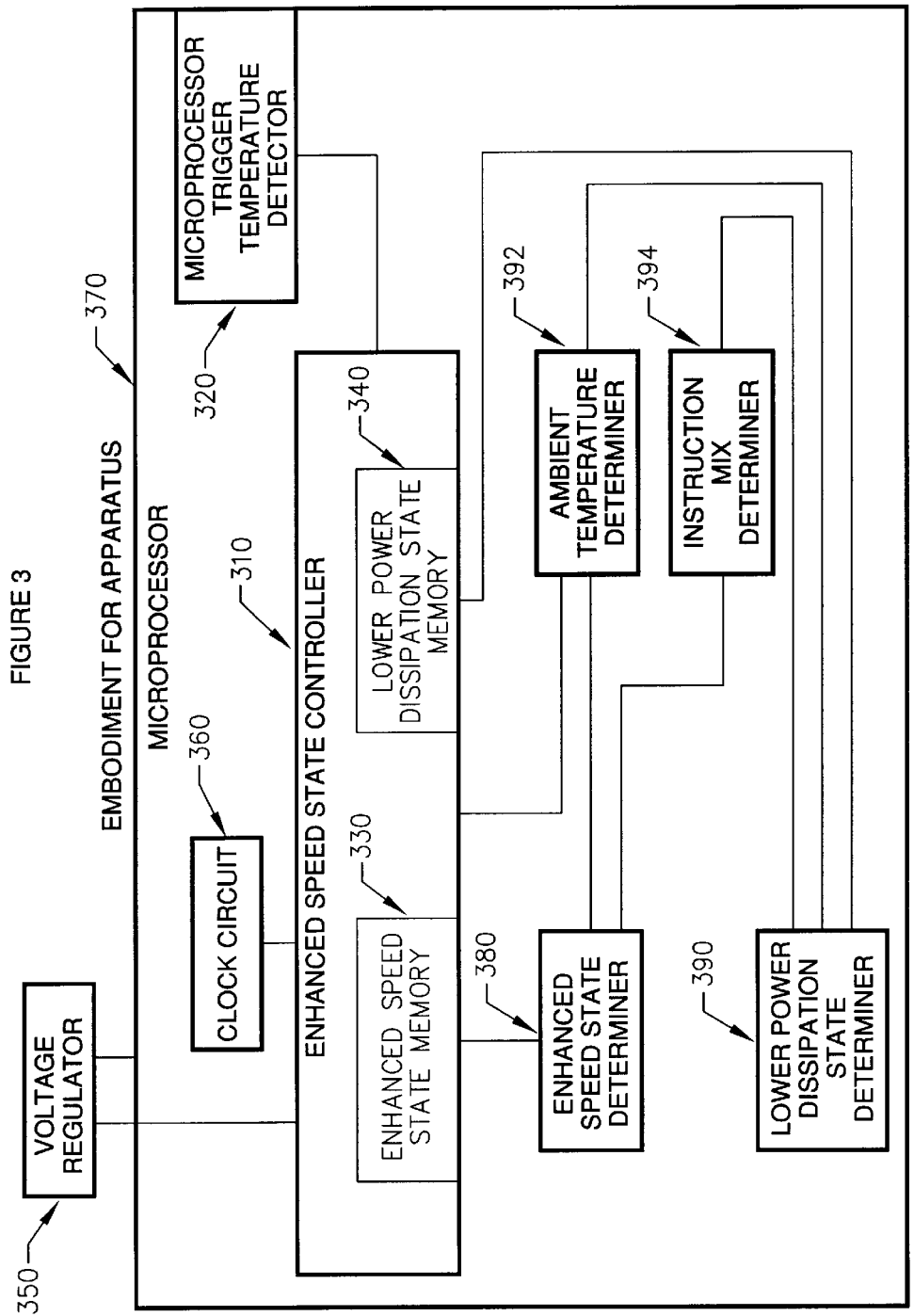

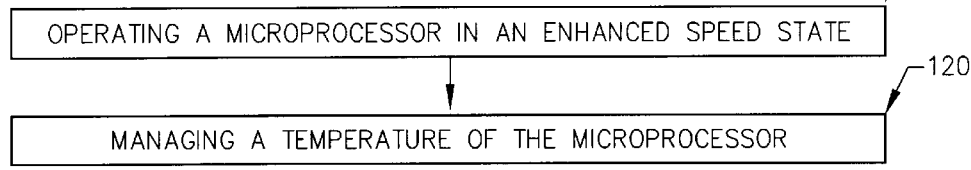
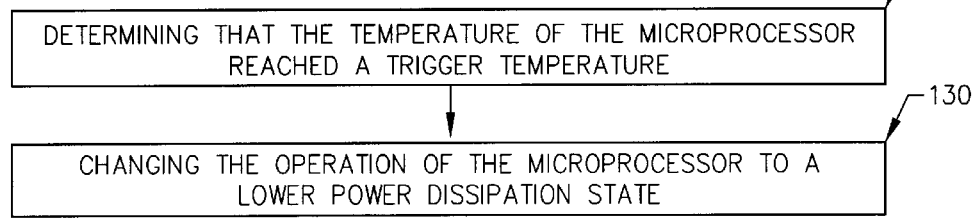
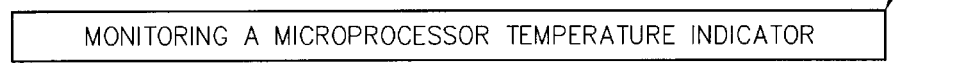

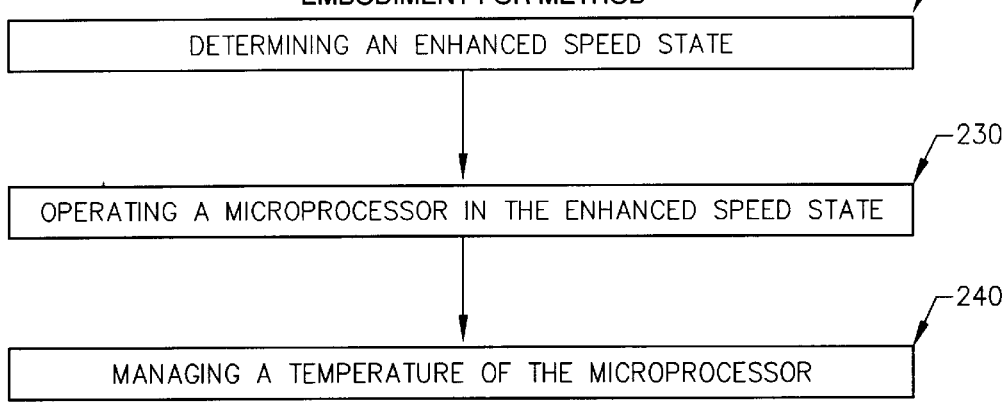
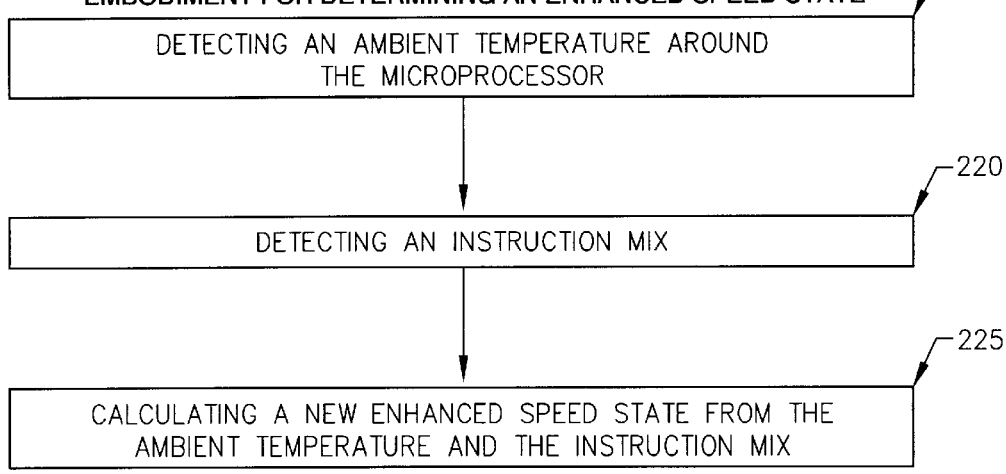

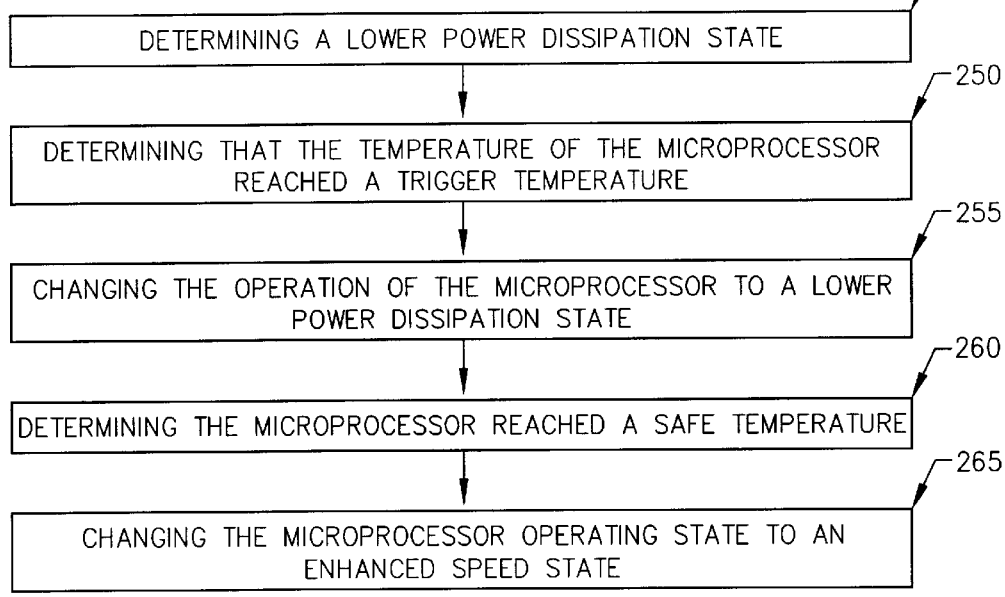

ALTERNATIVE EMBODIMENT FOR APPARATUS

METHOD, APPARATUS, AND MACHINE-READABLE MEDIUM TO ENHANCE MICROPROCESSOR PERFORMANCE

FIELD OF INVENTION

The present invention is in the field of enhancing microprocessor performance. More particularly, the present invention comprises a method, apparatus, and machine-readable medium to increase a microprocessor's speed by facilitating operation of the microprocessor above a thermal design power limit.

BACKGROUND

Microprocessor-operated devices are used for everything from garage door openers to telephones to bar code scanners to computers. Competition puts pressure on manufacturers to create smaller, faster, and more adaptable microprocessor-operated devices. One way of creating smaller, faster, and more adaptable microprocessor-operated devices is making more efficient use of a microprocessor's capabilities by increasing microprocessor speed since increasing microprocessor speed allows the microprocessor to perform more complex tasks per unit of time.

Microprocessor speed is a function of the microprocessor's clock frequency. This is the reason, for example, computers are marketed and compared using the clock frequencies such as 450 megahertz (MHz). Other evaluations are available because there are other limitations to the performance of microprocessor-operated devices but the clock frequency is significant.

The clock frequency is typically set by a clock circuit. The clock circuit can be separate from or a part of the microprocessor. Some clock frequencies, for example, are determined by a ratio of the system bus clock. The clock circuit produces a series of low-to-high and high-to-low voltage transitions that trigger the gate changes within the microprocessor and coordinate data transfers on the system bus. An important practical limitation to the clock frequency is power dissipation. The amount of power dissipated by a microprocessor is related to several factors including thermal properties, clock frequency, current, and operating voltage of the microprocessor, as is well known to those of skill in the art. This power dissipation is in the form of heat and must be removed at a rate sufficient to maintain the microprocessor's temperature below a damage temperature. If the microprocessor temperature rises above the damage temperature, the microprocessor may be damaged.

Since clock frequency and operating voltage are typically externally controlled, microprocessor manufacturers publish a thermal design power chart showing power dissipation for each microprocessor. It is up to the designer of the microprocessor-operated device to follow these guidelines to protect the microprocessor from being damaged.

The thermal design power chart lists a power dissipation for a microprocessor executing a worst-case instruction mix at different clock frequencies for worst-case leakage power and ambient temperature around the microprocessor with about a 20% to 25% safety margin, as is well known to those of ordinary skill in the art. Optimizing the design of microprocessor-operated devices, operating voltages, currents, and clock frequencies for these worst-case operating conditions reduces microprocessor performance.

On the other hand, if the microprocessor-operated devices, operating voltages, currents, and clock frequencies are designed for less than worst-case conditions, the temperature limits of the microprocessor will more likely be exceeded. In fact, it is possible to exceed these assumed worst-case conditions and increase the temperature to a temperature that will physically damage the microprocessor. Thus, designers of the microprocessor-operated devices use the worst-case conditions to design the microprocessor's normal operating states, i.e. normal speed operating states. In addition, to prevent damage, a temperature circuit monitors the microprocessor's temperature. The temperature circuit typically includes a thermocouple attached to the microprocessor's case or die. The thermocouple measures the temperature of the microprocessor's case or die and if the temperature rises to a trigger temperature, the microprocessor is shut down. Where the latency of the thermocouple is high, the trigger temperature is reduced to compensate for the increase in temperature between the time the trigger temperature is reached and the time the microprocessor is shut down. When the microprocessor cools down to a safe temperature, the microprocessor is turned on again. Further, a high latency is involved in shutting down and restarting the microprocessor when the temperature reaches a safe temperature. These latencies significantly reduce microprocessor performance.

BRIEF FIGURE DESCRIPTIONS

The accompanying drawings, in which like references indicate similar elements, show:

FIGS. 1a–d Flow chart of the present invention.

FIGS. 2a–f Alternative flow chart of the present invention.

Figure 4:
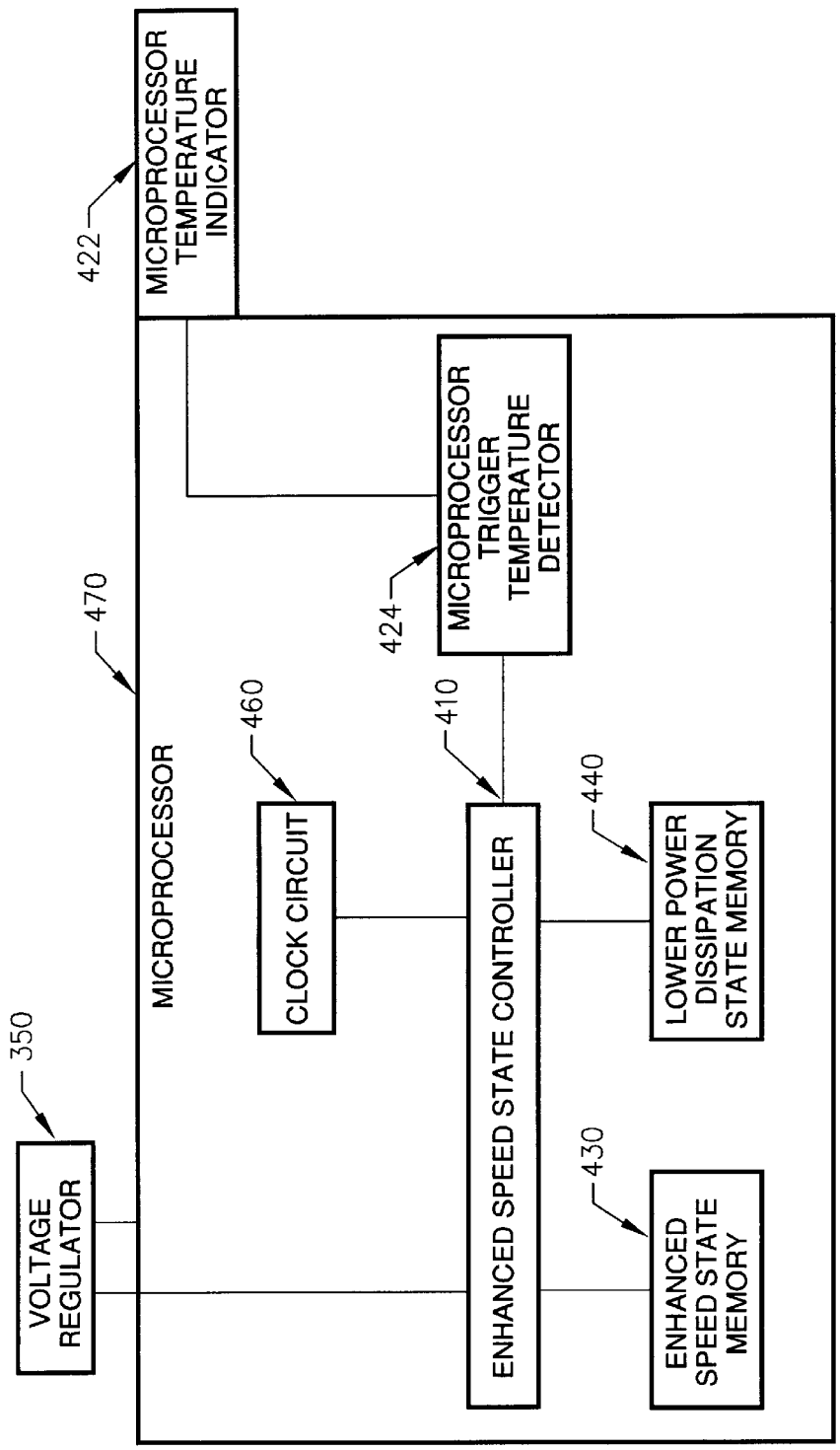

FIGS. 3–4 Example apparatus embodiments of the present invention.

Figure 5:
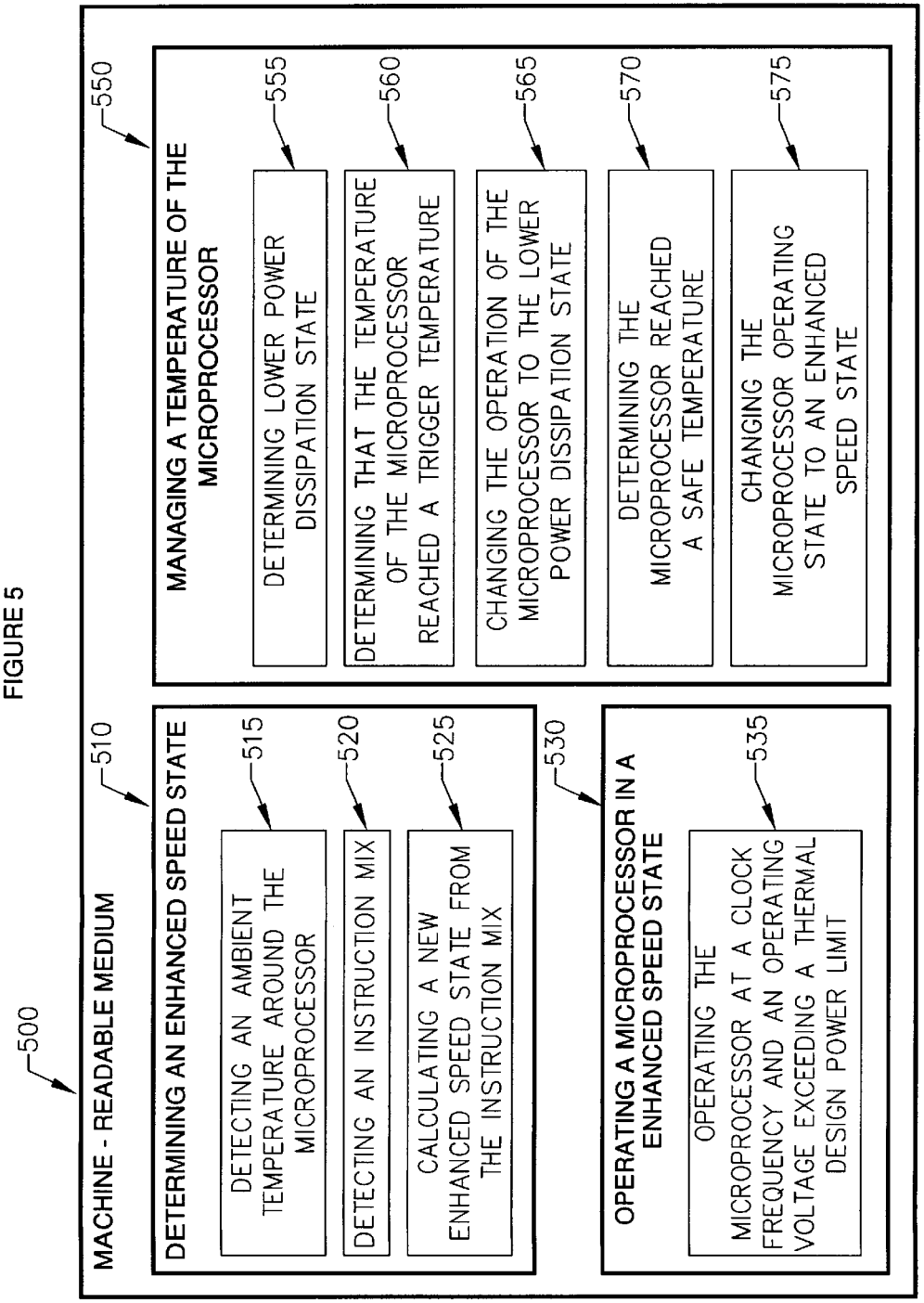

FIG. 5 Example machine-readable medium embodiments of the present invention.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

In particular, the following describes method, apparatus, and machine-readable medium embodiments to enhance microprocessor performance. Referring to FIGS. 1a–d, an example flow chart is shown. The method comprises operating a microprocessor in an enhanced speed state 110 and managing a temperature of the microprocessor 120. Operating a microprocessor in an enhanced speed state 110, in the present embodiment, occurs substantially simultaneously with managing a temperature of the microprocessor 120 and entails a microprocessor operated above a thermal design power limit to enhance microprocessor speed. For example, a typical thermal design power limit is set for an ambient temperature of 35 degrees Celsius for a non-air conditioned environment, an instruction mix of 80% of peak instruction mix for the microprocessor, and a leakage power about 6 watts. By assuming typical conditions, e.g. 25 degrees Celsius, 50% instruction mix, and 2 watts leakage, in the selection of a clock frequency, a microprocessor speed increase is realized. Managing a temperature of the microprocessor 120 is designed to prevent damage to the microprocessor when the temperature rises to a trigger temperature while maintaining the increased microprocessor performance. This increased microprocessor performance allows a less powerful microprocessor to be used to design smaller microprocessor-operated devices in some embodiments of the invention.

Referring now to FIGS. 1a–b, a detailed flow chart for managing a temperature of the microprocessor 120 for this example embodiment is shown. Here, managing a temperature of the microprocessor 120 comprises determining that the temperature of the microprocessor reached a trigger temperature 125 and changing the operation of the microprocessor to a lower power dissipation state 130. The trigger temperature is a temperature approaching a damage temperature for the microprocessor. In this embodiment, determining that the temperature of the microprocessor reached a trigger temperature 125 comprises monitoring the temperature acceleration of the microprocessor and selecting a trigger temperature based on the magnitude of the acceleration of the microprocessor temperature. The choice of the trigger temperature is based on the actual latency involved in changing the operation of the microprocessor to a lower power dissipation state 130, as well as other factors involved with cooling a microprocessor well known to those of ordinary skill in the art.

Referring now to FIGS. 1b–d, changing the operation of the microprocessor to a lower power dissipation state 130 comprises changing an operating frequency 132. In the lower power dissipation state, a reduced operating frequency state in the present embodiment, the power dissipation of the microprocessor is reduced enough that the microprocessor will cool down before reaching a damage temperature for the microprocessor. Further, the reduced operating frequency state does not reduce microprocessor performance as significantly as shutting down the microprocessor, when used in a manner well known to those of skill in the art.

Referring now to FIGS. 1b–c, a detailed flow chart for determining that the temperature of the microprocessor reached a trigger temperature 125 for this example embodiment is shown. Determining that the temperature of the microprocessor reached a trigger temperature 125 comprises monitoring a microprocessor temperature indicator 127. Monitoring a microprocessor temperature indicator 127 can have a latency complimentary to the designed latency for changing the operation of the microprocessor to a lower power dissipation state 130 and the chosen trigger temperature. Some microprocessors, for instance, change one degree Celsius per millisecond so if the trigger temperature is one degree Celsius less than the damage temperature, the total latency of determining that the temperature of the microprocessor reached a trigger temperature 125 and changing the operation of the microprocessor to a lower power dissipation state 130 should be less than one millisecond.

Referring now to FIG. 2a, an alternative embodiment to enhance microprocessor performance is shown. The embodiment is designed to adapt to a specific microprocessor-operated device and the conditions under which it operates. For example, the embodiment is well suited for use in a notebook, or laptop, computer and adapts to the ambient temperature and typical software applications in use. This embodiment comprises determining an enhanced speed state 210, operating a microprocessor in the enhanced speed state 230, and managing a temperature of the microprocessor 240. Determining an enhanced speed state 210, in the present embodiment, is completed before operating a microprocessor in the enhanced speed state 230. Before an initial use of the microprocessor, the enhanced speed state is determined from the contents of a memory register. During the microprocessor-operated device's initial use, the present embodiment determines a new enhanced speed state so the process continues to adapt to the microprocessor-operated device's current operating conditions. In this embodiment, the initial use can be when the notebook computer is turned on.

Referring to FIGS. 2a–b, an embodiment for determining an enhanced speed state 210 is shown. This embodiment dynamically determines a new enhanced speed state for the current operating conditions by detecting an ambient temperature around the microprocessor 215, detecting an instruction mix 220, and calculating a new enhanced speed state from the ambient temperature and the instruction mix 225. Calculating a new enhanced speed state from the ambient temperature and the instruction mix 225 comprises selecting an enhanced speed state well suited for an ambient temperature around the microprocessor and an instruction mix. A software-writeable setting can determine whether to use a current operating condition or a default operating condition for one or both the ambient temperature and the instruction mix, in a manner well known to those of ordinary skill in the art.

Referring to FIGS. 2a–d, an embodiment for managing a temperature of the microprocessor 240 is shown. This embodiment of the invention comprises determining a lower power dissipation state 245. Determining a lower power dissipation state 245 allows the microprocessor-operated device to adjust to actual operating conditions by determining a lower power dissipation state to minimize a microprocessor performance loss of the microprocessor 247. When microprocessor performance loss is minimized, determining that the temperature of the microprocessor reached a trigger temperature 250 and changing the operation of the microprocessor to a lower power dissipation state 255 may be substantially undetectable under typical operating conditions. Once in the lower power state, to further minimize microprocessor performance loss, determining the microprocessor reached a safe temperature 260 and changing the microprocessor operating state to an enhanced speed state 265, places the microprocessor back into an enhanced speed state. In the present embodiment, a default safe temperature is used until a new safe temperature is determined taking into consideration factors such as the ambient temperature around the microprocessor and the instruction mix, in a manner well known to those of skill in the art. Assuming the microprocessor reaches a trigger temperature, in the present embodiment of the invention, determining an enhanced speed state 210 determines an enhanced speed state that is less likely reach a trigger temperature, further reducing the microprocessor performance loss.

Referring now to FIGS. 2c–f, embodiments of determining that the temperature of the microprocessor reached a trigger temperature 250 and changing the operation of the microprocessor to a lower power dissipation state 255, are shown. In the present embodiment, microprocessor performance during transition to the lower power dissipation state is further enhanced by incorporating a low latency embodiment for determining that the temperature of the microprocessor reached a trigger temperature 250. The low latency embodiment comprises monitoring an on-die thermal diode 252. The method of monitoring an on-die thermal diode 252 can be accomplished in several ways in various embodiments with varying levels of latency, in manners well known to persons of ordinary skill in the art. Latency is reduced in the present embodiment by monitoring an output to the on-die thermal diode rather than translating and/or comparing the output of this or another microprocessor temperature indicator. This reduced latency can facilitate preventing the temperature of the microprocessor from rising to a damage temperature 257 as an embodiment for changing the operation of the microprocessor to a lower power dissipation state 255.

In some alternative embodiments, the present invention comprises storing a normal speed operating state and changing to the normal speed operating state. For example, some notebook computers have a power conservation state when operating on battery power and a high performance state when working on alternating current from a wall outlet. In some embodiments of the present invention, the power conservation state and the high performance state are normal speed operating states and both are also lower power dissipation states. In several of these embodiments, the lower power dissipation state is chosen from the normal speed operating states based on predefined conditions, for reasons well known to those of ordinary skill in the art. For example, an embodiment of the conditions used for selecting a lower power dissipation state comprises determining that the temperature acceleration is greater than a temperature acceleration stored in a memory register and selecting a power conservation state; otherwise selecting higher performance state. In alternative embodiments where more than one lower power dissipation state is defined, the lower power dissipation state can be selected based on the ambient temperature near the microprocessor.

In further embodiments of the invention, rather than monitoring an on-die microprocessor temperature indicator, a microprocessor temperature indicator attached to the microprocessor's case is monitored. In some of these embodiments, the thermocouple attached to the microprocessor case is monitored as the microprocessor temperature indicator. Where monitoring the thermocouple has a high latency, the other latencies involved in managing a temperature of the microprocessor 120 and 240, in FIGS. 1a and 2a, must be designed to compliment that monitoring latency.

Several embodiments of the present invention comprise changing a clock frequency as an embodiment for changing the operation of the microprocessor to a lower power dissipation state 130 and 255, in FIGS. 1b and 2c. Some of these embodiments comprise adjusting the clock frequency until the temperature of the microprocessor begins to lower. One group of these embodiments comprises operating a microprocessor in an enhanced speed state optimized for minimal microprocessor performance loss when changing to a lower power dissipation state. An alternative group of these embodiments comprise operating a microprocessor in an enhanced speed state optimized for maximum microprocessor performance wherein the maximum microprocessor performance comprises using a high trigger temperature for the current operating conditions considering the actual latencies involved in cooling the microprocessor. Several of these embodiments comprise an enhanced speed state and a lower power dissipation state and do not comprise determining an enhanced speed state or a lower power dissipation state from an ambient temperature or an instruction mix. In many of these embodiments, the trigger temperature is chosen as one degree Celsius less than the damage temperature. A choice between many of such embodiments of the present invention depend upon specific design criteria for the microprocessor-operated device, well understood by persons of ordinary skill in the art.

Referring to FIG. 3, an embodiment for an apparatus to operate a microprocessor in an enhanced speed state is shown. In this embodiment of the invention, an enhanced speed state controller 310 is coupled to a microprocessor trigger temperature detector 320. The enhanced speed state controller 310 is designed to respond to an output from the microprocessor trigger temperature detector 320 when indicating that a trigger temperature has been reached. The enhanced speed state controller 310, also coupled to an output of the ambient temperature determiner 392, is designed to respond differently to more than one trigger temperatures in accordance with an output of the ambient temperature determiner 392. The present embodiment has two perceived trigger temperatures, high and low, and two perceived outputs from the ambient temperature determiner 392, high and low. For example, when the ambient temperature is high, the enhanced speed state controller 310 responds to the low microprocessor trigger temperature. On the other hand, when the ambient temperature is low, the enhanced speed state controller 310 is responsive to the high microprocessor trigger temperature but not the low trigger temperature.

Referring still to FIG. 3, the enhanced speed state controller 310 is designed to change the operation of the microprocessor 370 via the coupling to the voltage regulator 350 and the clock circuit 360. In addition, the enhanced speed state controller 310 comprises an enhanced speed state memory 330 and a lower power dissipation state memory 340. The enhanced speed state memory 330 is designed to hold the parameters of a default enhanced speed state and is coupled to an enhanced speed state determiner 380 that is designed to calculate an enhanced speed state adapted for the specific types of use of the microprocessor-operated device. To facilitate the calculation of an enhanced speed state, the enhanced speed state determiner 380 is coupled to the ambient temperature determiner 392 and the instruction mix determiner 394. The ambient temperature determiner 392 is designed to measure the ambient temperature around the microprocessor 370 and communicate that temperature to the enhanced speed state determiner 380. The instruction mix determiner 394 is designed to communicate a current instruction mix to the enhanced speed state determiner 380. With an instruction mix and an ambient temperature, the enhanced speed state determiner 380 is designed to calculate a new high and low enhanced speed state. For example, assume this notebook computer is typically used to run a word processor, a spreadsheet, and an internet email software all at one time. The instruction mix is approximately 20% of the microprocessor's capacity. The ambient temperature of around the microprocessor is 25 degrees Celsius. With representations of these actual figures available, the enhanced speed state determiner 380, in the present embodiment, is designed to output an enhanced speed state based on built-in logic. The built-in logic can be based on microprocessor power dissipation and notebook heat dissipation information.

In the present embodiment, the enhanced speed state controller 310 has the ability to change an operating voltage by transmitting a signal to voltage regulator 350 and to change a clock frequency of the microprocessor by transmitting a signal to the clock circuit 360. To enhance microprocessor speed, this embodiment is designed to change the operating voltage and clock frequency to those stored in the enhanced speed state memory 330 and to monitor the microprocessor temperature with the microprocessor trigger temperature detector 320. In case the temperature of the microprocessor reaches a trigger temperature, the enhanced speed state controller 310 is also designed to change the microprocessor operation state to the lower power dissipation state stored in the lower power dissipation state memory 340 until a safe temperature is reached and then change the microprocessor operation state back to the enhanced speed state stored in the enhanced speed state memory 330.

Referring again to FIG. 3, the lower power dissipation state memory 340 is coupled to the lower power dissipation state determiner 390. The lower power dissipation state determiner 390, in this embodiment of the invention, is designed to determine a lower power dissipation state for an actual ambient temperature and instruction mix such that minimal reduction of microprocessor performance results from operation of the microprocessor in the lower power dissipation state. To facilitate, the lower power dissipation state determiner 390 is coupled to the ambient temperature determiner 392 and the instruction mix determiner 394.

The microprocessor trigger temperature detector 320 of the present embodiment comprises an on-die thermal diode. The on-die thermal diode comprises a current-type output based on the temperature of the diode. Alternate embodiments of the present invention comprise one or more on-die thermal devices comprising voltage or resistance type outputs. Some of these embodiments are implemented by apparatus exterior to the microprocessor. Several of these embodiments comprise default enhanced speed states and lower power dissipation states without comprising apparatus to determine new enhanced speed states or lower power dissipation states from ambient temperature or instruction mix. A person of ordinary skill in the art can determine how to implement each part of the apparatus in devices exterior to the microprocessor.

Referring now to FIG. 4, there is shown an alternative apparatus embodiment for the present invention comprising an enhanced speed state controller 410 coupled to a voltage regulator 350 and a clock circuit 460. The enhanced speed state controller 410 is designed to control the state of microprocessor 470 via the voltage regulator 350 and the clock circuit 460. The enhanced speed state controller 410 is coupled to an enhanced speed state memory 430 to hold the parameters of an enhanced speed state and a lower power dissipation state memory 440 to hold the parameters of a lower power dissipation state. Further, the microprocessor trigger temperature detector 424 couples to the enhanced speed state controller 410 to indicate when to change the operation of the microprocessor 470 to the enhanced speed state or from the enhanced speed state to the lower power dissipation state. In the present embodiment, the microprocessor trigger temperature detector 424 is coupled to a microprocessor temperature indicator 422 that measures the microprocessor's 470 case temperature. The microprocessor trigger temperature detector 424 monitors the change in temperature from one reading to the next and is designed to select a trigger temperature based upon the acceleration of the temperature output by the microprocessor temperature indicator 422, in manners well known to a person of ordinary skill in the art. When the selected trigger temperature is reached, the microprocessor trigger temperature detector 424 is designed to output a trigger to the enhanced speed state controller 410. Upon cooling to a safe temperature, as determined by the selected trigger temperature, the microprocessor trigger temperature detector 424 is designed to output an indication that a safe temperature was reached. Then, the enhanced speed state controller 410 is designed to return the microprocessor 470 to the enhanced speed state.

Alternative embodiments comprise an enhanced speed state controller such as shown in 310 and 410 of FIGS. 3 and 4, designed to adjust the operation of a microprocessor such as 370 and 470 of FIGS. 3 and 4 to enhanced speed states of increased microprocessor speed. In some of these embodiments, the enhanced speed controller finds a maximum enhanced speed state by monitoring steady state temperature via a microprocessor trigger temperature detector such as shown in 320 and 424 of FIGS. 3 and 4. In other embodiments, the microprocessor trigger temperature detector is designed to trigger at a single trigger temperature.

In further embodiments of the present invention, an enhanced speed state controller is designed to change the operation of a microprocessor to a lower power dissipation state for a pre-defined period of time and then return the operation of the microprocessor to an enhanced speed state. In addition, some embodiments are designed to change the operation of a microprocessor to prevent the microprocessor from rising above a damage temperature. In some of these embodiments, the enhanced speed state controller is designed to reduce the operating voltage. In alternative embodiments, the enhanced speed state controller is designed to reduce the clock frequency. Apparatus exterior to the microprocessor implements many of these embodiments. Further, apparatus both interior and exterior to the microprocessor implements several embodiments. A person of ordinary skill in the art can determine devices necessary to implement the apparatus exterior to a given microprocessor.

Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . Several embodiments of the present invention can comprise more than one machine-readable medium depending on the design of the machine.

This machine-readable medium embodiment 500 of the invention comprises determining an enhanced speed state 510. Determining an enhanced speed state 510 comprises detecting an ambient temperature around the microprocessor 515, detecting an instruction mix 520, and calculating a new enhanced speed state from the instruction mix 525. This allows the present embodiment of the invention to dynamically adapt to different microprocessor-operated devices having different operating conditions. For example, when the present embodiment is in a microprocessor controller for an automated assembly line designed to operate at high temperatures but the demand for microprocessor functioning, the instruction mix, is low, the present enhanced state determiner is designed to select an enhanced speed state for high ambient temperatures while taking advantage of the low instruction mix. On the other hand, when the machine is a desktop computer operating in air conditioning on a regular basis, this embodiment is designed to take advantage of the low ambient temperature to enhance the microprocessor speed.

The present embodiment further comprises operating a microprocessor in an enhanced speed state 530. Operating a microprocessor in an enhanced speed state 530 is designed to take advantage of the enhanced speed state adapted for actual operating conditions by operating the microprocessor at a clock frequency and an operating voltage exceeding a thermal design power limit 535. In particular, the thermal design power limit is the limit set by a manufacturer of a microprocessor for worst-case power dissipation conditions for the microprocessor, with a safety margin, for assumed rather than actual operating conditions.

Referring still to FIG. 5, the example machine-readable medium embodiment 500 further comprises managing a temperature of the microprocessor 550. Managing a temperature of the microprocessor 550 is designed to protect the microprocessor from permanent damage resulting from a change in an operating condition and enhances microprocessor speed further by reducing latency of adjusting the operational state of the microprocessor to the changed operating condition. For example, the latency involved in monitoring a thermocouple attached to the microprocessor case, shutting down the microprocessor when it hits a trigger temperature, and returning the microprocessor to operation when the temperature reaches a safe temperature can be a relatively long latency. Managing a temperature of the microprocessor 550 comprises determining a lower power dissipation state 555, determining that the temperature of the microprocessor reached a trigger temperature 560, and changing the operation of the microprocessor to the lower power dissipation state 565. In the present embodiment of the invention, determining a lower power dissipation state 555 is designed to cool the microprocessor quickly and return to an enhanced microprocessor speed less likely to cause the microprocessor to reach the trigger temperature. Determining a lower power dissipation state 555 comprises selecting a lower power state sufficient to reduce the temperature of the microprocessor to a safe temperature. Upon reaching a safe temperature, the present invention is designed for determining the microprocessor reached a safe temperature 570 and changing the microprocessor operating state to an enhanced speed state 575.

In some alternative embodiments, the present invention comprises storing a lower power dissipation state as an operating voltage and clock frequency. Other embodiments comprise storing a lower power dissipation state as a function of a current operating condition. Several embodiments, in addition, comprise software selectable lower power dissipation states and enhanced speed states. Some of these embodiments, however, comprise limitations on the enhanced speed states selected by the software dependent upon system information.

In further embodiments of the invention, the machine-readable medium may comprise default states for multiple microprocessor-operated devices. Some of these embodiments also comprise identifying the microprocessor-operated device and selecting a set of default enhanced speed states and lower power dissipation states for that specific microprocessor-operated device, in a manner well known to those of ordinary skill in the art.

What is claimed is:

1. A system, comprising:
    an enhanced speed state controller;
    an enhanced speed state memory coupled to said enhanced speed state controller;
    a lower power dissipation state memory separate from the enhanced speed state memory and coupled to said enhanced speed state controller;
    an instruction mix determiner coupled to the lower power dissipation state memory;
    a microprocessor trigger temperature detector coupled to said enhanced speed state controller;
    a voltage regulator coupled to said enhanced speed state controller; and
    a clock circuit coupled to said enhanced speed state controller.

2. The system of claim 1, further comprising:
    an enhanced speed state determiner coupled to said enhanced speed state memory; and
    an ambient temperature determiner coupled to the enhanced speed state determiner.

3. The system of claim 2, further comprising:
    a lower power dissipation state determiner coupled to said lower power dissipation state memory and to the ambient temperature determiner.

4. The system of claim 1, wherein said enhanced speed state controller comprises an enhanced speed state controller having a latency of less than the difference between a latency to raise a microprocessor temperature to a damage temperature and a latency of said microprocessor trigger temperature detector.

5. The system of claim 1, wherein said microprocessor trigger temperature detector comprises an on-die thermal diode.

* * * * *